United States Patent

Brown

[15] 3,682,277

[45] Aug. 8, 1972

[54] DISC BRAKES AND MOUNTING STRUCTURE THEREFOR

[72] Inventor: Peter William Brown, 43 Hansell Drive, Dorridge, Solihull, England

[22] Filed: July 24, 1970

[21] Appl. No.: 58,089

[52] U.S. Cl. .......................... 188/73.3, 188/205 A
[51] Int. Cl. .............................................. F16d 65/00
[58] Field of Search ....... 188/205 A, 71.1, 72.4, 72.5, 188/72.6, 72.9, 73.3, 73.5; 308/62

[56] References Cited

UNITED STATES PATENTS

| | | |
|---|---|---|
| 3,410,372 | 11/1968 | Hodkinson et al. ... 188/72.6 X |
| 2,920,497 | 1/1960 | Wiken ..................... 308/62 X |
| 2,531,341 | 11/1950 | Meador, Jr. ........... 188/72.4 X |
| 3,374,866 | 3/1968 | Miles ..................... 188/73.3 X |

*Primary Examiner*—George E. A. Halvosa
*Attorney*—Scrivener, Parker, Scrivener and Clarke

[57] ABSTRACT

The invention concerns disc brakes of the kind in which only one of the friction elements is directly moved into engagement with the brake disc or other rotor, the other friction element being displaced as a result of reaction forces set up by such engagement and for this purpose being carried by a caliper member which is slidable responsive to such reaction forces. In a disc brake of this type in accordance with the present invention, the caliper is mounted for sliding movement on a first pin arranged between the caliper member and a fixed torque plate member adjoining the brake disc, rotation of the caliper member about said first pin being restrained by a second pin secured to one of said members in circumferentially spaced relation with said first pin. The second pin is located in an aperture in the other of said members by an annular eccentric bush which at least partially embraces the second pin and is slidably received in said aperture to enable tolerance in the circumferential spacing of the pins to be accommodated during assembly of the brake and to enable the drag force to be aportioned between the two pins.

7 Claims, 8 Drawing Figures

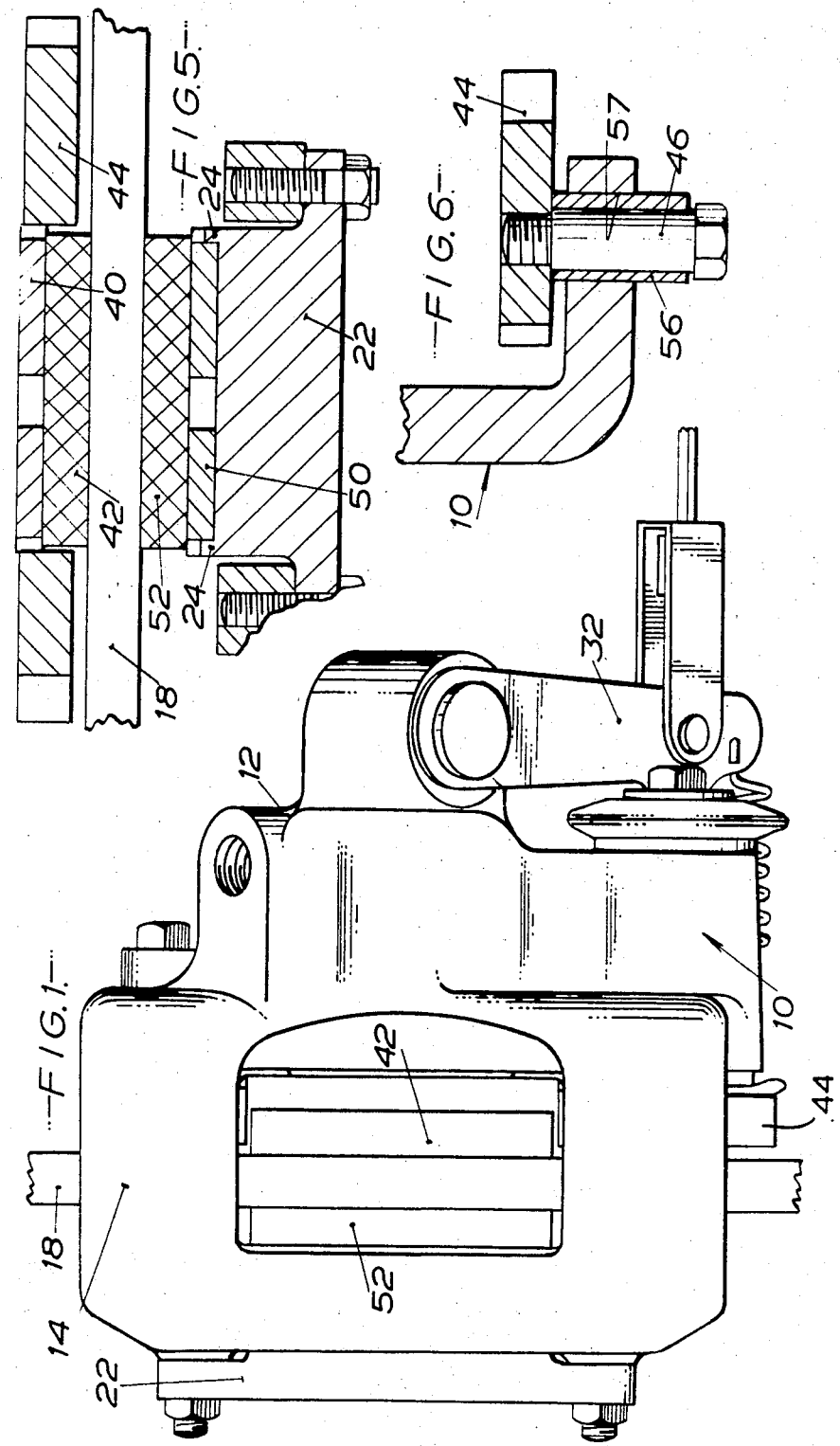

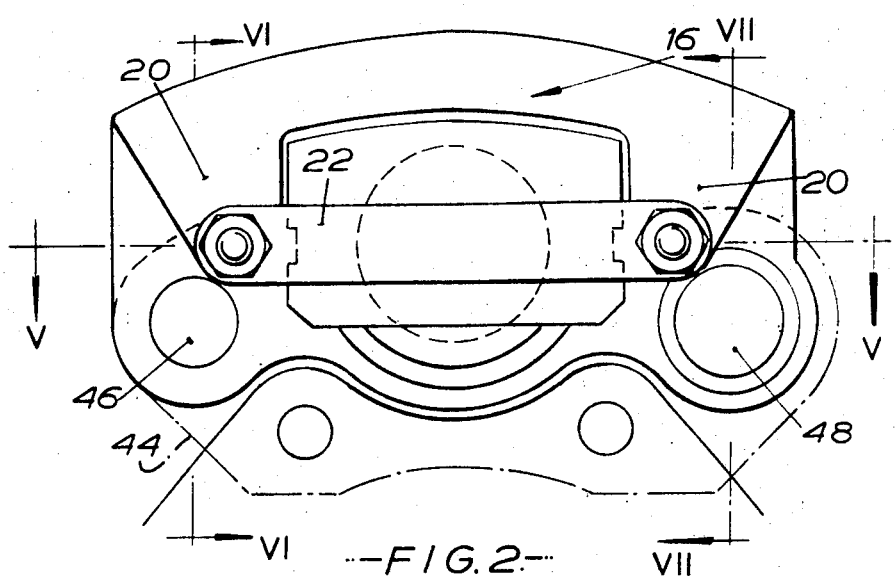
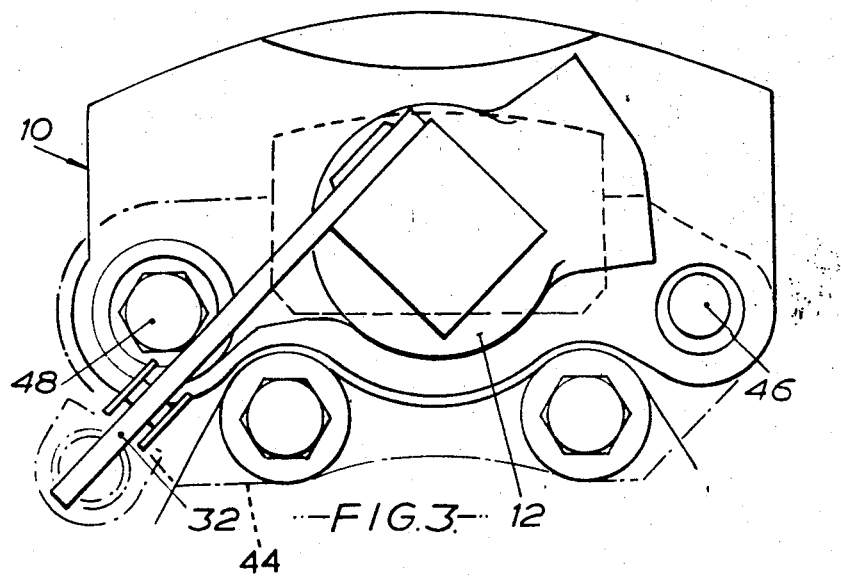

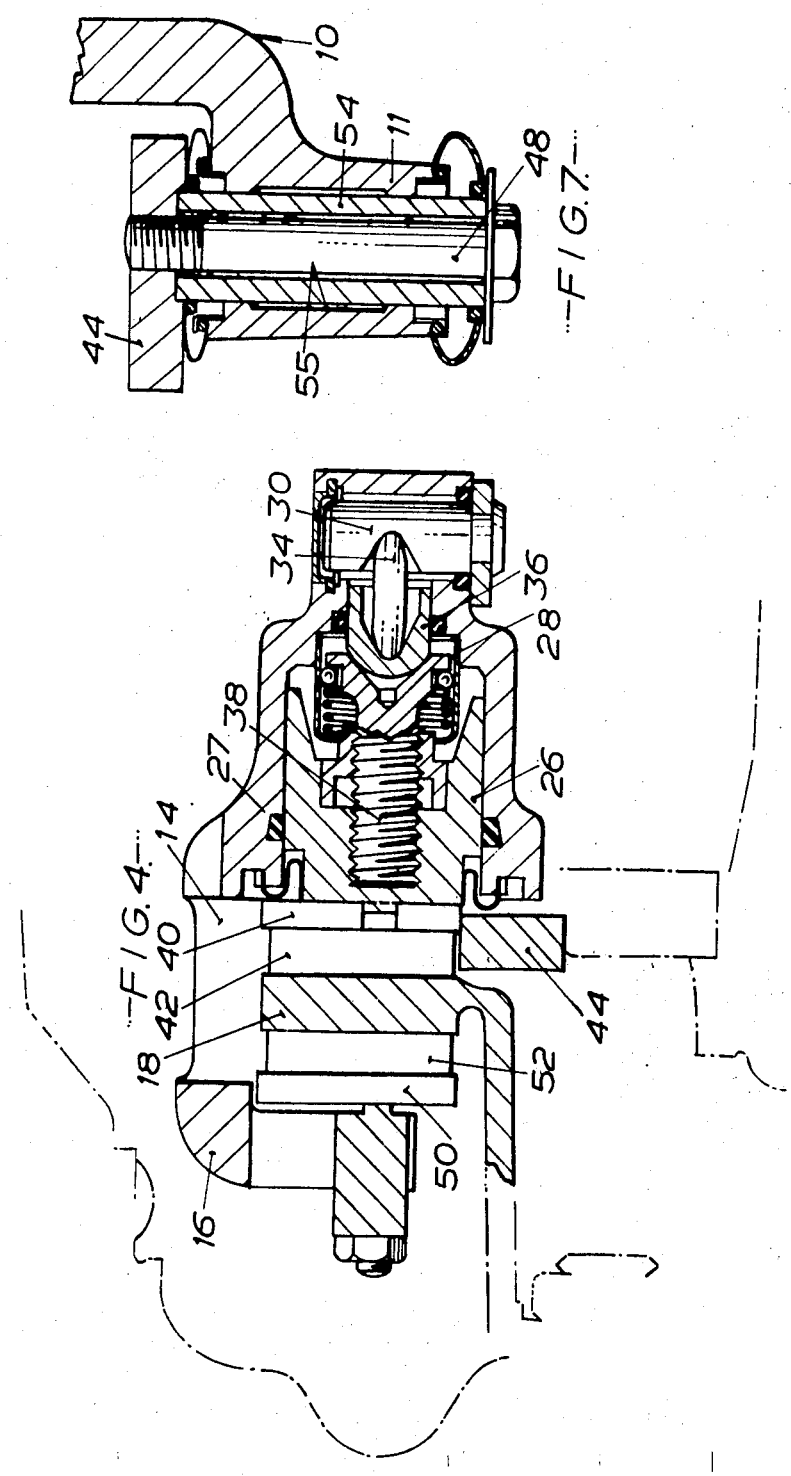

DISC BRAKES AND MOUNTING STRUCTURE THEREFOR

This invention concerns disc brakes of the kind in which only one of the friction elements is directly moved into engagement with the brake disc or other rotor, the other friction element being displaced as a result of reaction forces set up by such engagement and for this purpose being carried by a caliper member which is slidable responsive to such reaction forces. The slidable member usually takes the form of a so-called caliper or a yoke plate on which at least one of the friction elements, usually the indirectly operated friction element, is mounted.

It is known, in a disc brake of the kind described, for the caliper member to be mounted for sliding movement on a first pin arranged between the caliper member and a fixed torque plate member adjoining the brake disc, rotation of the caliper member about said first pin being restrained by a second pin secured to one of said members in circumferentially spaced relation with said first pin.

One object of the present invention is to provide a disc brake of the above type in which tolerance in the circumferential spacing of the first and second pins can be accommodated during assembly of the brake.

A second object of the present invention is to provide a disc brake of the above type in which the proportion of the drag force carried by the two pins in operation of the brake can be predetermined during the assembly of the brake.

According to the present invention, in a disc brake of the above type, the second pin is located in an aperture in the other of said members by an annular eccentric bush which at least partially embraces said second pin and is slidably received in said aperture.

The invention will be further described, by way of example, with reference to the accompanying drawings, in which:

FIG. 1 is a plan view of a disc brake embodying the invention,

FIG. 2 is an end view thereof taken from the left-hand side of FIG. 1,

FIG. 3 is a similar view taken from the right-hand side of FIG. 1,

FIG. 4 is a sectional elevation through the brake caliper;

FIGS. 5, 6 and 7 are sectional details taken respectively on the line V—V, VI—VI and VII—VII of FIG. 2.

Figure 8:
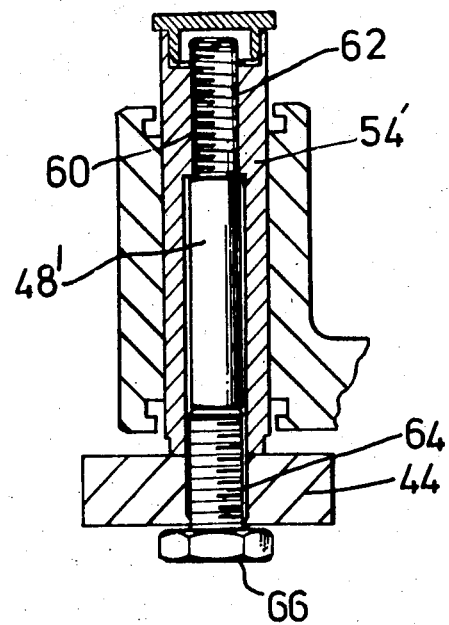
FIG. 8 is a view similar to FIG. 7 showing a second embodiment.

The embodiment of disc brake illustrated in the drawings comprises a caliper generally designated 10 having a body portion 12, a bridge portion 14 and an end limb assembly 16 which together impart to the caliper 10, a generally U-shaped configuration with the bridge portion 14 straddling a brake disc 18. The end limb assembly 16 includes a pair of circumferentially spaced ears 20 depending from the bridge portion 14 and jointed by a transverse beam 22 bolted to them. The front face of the beam 22 is shaped to present circumferentially spaced lugs 24 for locating an indirectly operated friction pad as hereinafter described in more detail.

The body member 12 of the caliper 10 is internally formed to provide a hydraulic cylinder within which is received a hydraulic piston 26 displaceable towards the brake disc 18 responsive to hydraulic pressure in the cylinder. The piston 26 is also displaceable towards the brake disc through a detachable strut assembly generally designated 28 and including a cam 30 displaceable upon angular movement of a lever 32 to apply thrust through a dolly 34 to a dome ended plunger 36 which in turn acts on a strut 38 engageable with the piston 26. The strut 38 is screw threaded into the piston 26 so that relative rotation between them, and effected in conventional manner responsive to wear of the brake friction linings, will effect adjustment of the length of the strut assembly to compensate for that wear.

The piston 26 is arranged to act on a backplate 40 carrying a pad 42 of friction material, the backplate 40 being arranged to be guided in an aperture of a torque plate 44 fixed to a convenient part of a vehicle structure and interposed between the body member 12 and the brake disc 18. The torque plate 44 carries a pair of circumferentially spaced and axially directed pins 46 and 48. As will be more evident from FIGS. 6 and 7, the caliper 10 is mounted for sliding movement on the pins 46 and 48 and such sliding movement occurs as a result of the reaction set up when the friction pad assembly 40, 42 is moved towards and engages the brake disc 18 responsive to actuation by the hydraulic piston 26. As a consequence of such movement, a second friction pad assembly comprising a backplate 50 carrying a lining 52 of friction material is urged towards the disc 18 responsive to the sliding movement of the caliper. As will be noted the backplate 50 is engaged to accept the lugs 24 in the beam 22, which are arranged to prevent both circumferential and radial displacement of the indirectly operated pad assembly.

The drag forces experienced by the friction pads are transferred in the case of the directly operated pad 40, 42 to the torque plate 44. In the case of the indirectly operated pad 50, 52 however, the drag forces are transferred through the lugs 24 and the caliper to the pin 48 and thence to the torque plate 44. The tendency of the caliper to rotate due to this transfer of drag forces is resisted by the pin 46.

The construction and arrangement of the drag taking pin 48 will be evident from FIG. 7 which shows that the torque plate 44 has a tapped hole for receiving a threaded portion of the pin 48, which takes the form of a bolt. The face of the torque plate 44 by which the bolt is introduced into the tapped hole is recessed to receive a tubular sleeve 54 having an internal diameter such that it is radially spaced from the bolt 48 to enable the bolt to pass through it with clearance. The head of the bolt 48 clamps the sleeve 54 to the torque plate 44 so that the sleeve is loaded under compression. The sleeve 54 in turn passes through a bore in a rearwardly extending boss 11 of the caliper body member and the bore in the boss is relieved between its end regions so as to provide a two point sliding contact between the boss and the sleeve.

The pin 46 will be seen from FIG. 6 to be located in an eccentric bush 56 having its external surface slidably arranged in an aperture 57 formed to receive it in the caliper body, whereby the bush serves as support means for the pin relative to the aperture.

It is to be noted that with this arrangement of the pin 46 and the eccentric bush 56, since the axis of the pin 46 and the axis of the bush 56 are substantially in line in the radial direction, there can be substantially no radial movement of the caliper relative to the torque plate since the bush 56 will not rotate on the pin 46. However, the bush 56 will rotate on the pin 46 when circumferential pressure is applied so that the pin and bush act as a circumferential slot in which the pin is slidable.

Thus the use of the eccentric annular bush 56 allows the pin and cylindrical sleeve arrangement to be used without the problem of tolerance and of binding under load, since tolerance in the circumferential spacing of the pins 46, 48 can be accommodated by rotation of the bush 56 within the aperture 57 to shift the axis of the internal bore of the eccentric bush 56 into line with the axis of the pin 46. However, the take-up of radial tolerance is substantially nil so that very little angular movement of the caliper is allowed and rotational flop is negligible.

Furthermore the eccentric bush 56 can be of a relatively non-corrodable material such as a synthetic polymer material for example nylon, whereby to alleviate the problem of corrosion or a welding reaction between the bearing surfaces which can occur when these surfaces are both metallic. Alternatively, the eccentric bush can be made of compressible or resilient material so that any brake drag from the caliper to be transmitted to the torque plate must be substantially transmitted by the pin 48 and not the pin 46.

It is also possible to utilize an eccentric bush, such as the bush 56, to preselect the proportion of the drag force taken by the two pins 46,48. The "drag force" is the resultant of the frictional forces produced by the engagement of the indirectly actuated brake pad and the brake disc or rotor, which resultant acts along a line known as the drag line. During a braking operation, the brake force acts in a generally horizontal direction (FIG. 2) on the brake pads and must be balanced by reaction forces exerted through the pins 46 and 48. The force on the trailing pin 46 must act in the direction of the line joining the center of that pin with the center of the eccentric bush 56, otherwise the latter would rotate, assuming negligible pin to bush and bush to bearing frictional resistance. Therefore by projecting this line onto the drag line through which the brake force acts, the concurrent point of all the forces can be determined. Thus, assuming that the spacing between the centers of the apertures 55 and 57 in the caliper 10 are fixed, if the spacing between the centers of the pins 46, 48 is altered so that the eccentric bush has to rotate to a different position to accommodate the pins, it is apparent that the reaction force on the trailing pin 46 will be in a different direction and hence will be of a different magnitude, since the drag line remains substantially unaltered. In this way it is possible to preselect, between the pins 46 and 48, the proportions of the drag force which they will be required in service to take off.

Similarly, taking into account the pin to bush and bush to bearing frictional resistance, it is possible to preselect the angular position of the eccentric bush to retain the preselected proportions of drag force to be taken by each pin.

Although the embodiment described and its variations, show the pins attached to the torque plate 44, the caliper 10 being slidable on the pins so as to be movable relative to the fixed torque plate, the pins 46, 48 could in all cases be equally well fastened to the caliper. In this case the torque plate would be provided with suitable apertures or bores for slidably receiving the pins.

In the embodiment described, a seal 27 for the piston 26 is located in the wall of the hydraulic cylinder adjacent the open end of the cylinder bore. This necessitates that the axial length of the cylinder bore is relatively great since the axial distance from the back internal wall of the cylinder to the seal must be at least three friction pad thicknesses in order to allow efficient working in the maximum worn condition and a further portion is necessary for piston guiding purposes. If however, the seal is carried by the piston, a shorter cylinder length is possible which means that a thicker and stronger torque plate can be accommodated in a brake of the same axial dimension.

It is envisaged that the support means locating the trailing pin 46 in the aperture 57 could comprise means other than an annular sleeve. For example, the sleeve could be replaced by a plurality of resilient support means angularly disposed around the wall of the aperture 57 which support the pin 46 relative to this aperture.

The means of mounting the sleeve 54 relative to the torque plate 44 in the embodiment illustrated is by means of the bolt 48 which clamps the sleeve 54 to the torque plate 44 so that the sleeve 54 is loaded under compression. An alternative way of mounting the sleeve 54 is shown in FIG. 8. A sleeve 54' is provided at its end remote from the torque plate 44 with an internal screw-thread 62. The bolt 48 is replaced by an elongate stud 48' which is correspondingly screw-threaded at 60. The stud 48' is screwed through the screw-threaded aperture 64 in the torque plate, normally occupied by the bolt 48, from the side of the torque plate remote from the sleeve, until the head 66 of the stud is hard up against the torque plate. The sleeve 54' is then introduced over the stud so that its unthreaded end faces the torque plate. The length of the stud is arranged to be such that it can engage the threads on the sleeve which is then rotated to bring it into engagement with the torque plate in an annular groove therein. When the stud is then rotated in a direction to retract it from the torque plate, a compressive strain is applied to the sleeve. The head 66 of the stud 48' can be arranged to shear off when a predetermined strain has been applied to the sleeve whereby the sleeve is rigidly held relative to the torque plate.

I claim:

1. In a disc brake of the type in which only one of a pair of friction elements is directly moved into engagement with the brake disc; the other friction element being displaced as the result of reaction forces set up by such engagement and for this purpose being carried by a caliper member, in combination with said caliper member, a first pin arranged between the caliper member and a fixed torque plate member adjacent the brake disc and slidably mounting said caliper member, a second pin secured to one of said members in circumferentially spaced relation with said first pin for restraining rotation of the caliper member about said first pin, means defining an aperture in the other of said members, and an annular eccentric bush slidably received in said aperture and at least partially embracing said second pin.

2. A disc brake according to claim 1, in which said second pin is of circular cross-section, and said annular eccentric bush has an inner diameter substantially that of the outer diameter of said second pin and an outer diameter substantially that of said aperture.

3. A disc brake according to claim 2 in which said aperture is located in the caliper member and the eccentric bush is freely rotatable within said aperture whereby tolerance in the circumferential spacing of said first and second pins can be accommodated during assembly of the brake by rotation of the eccentric bush within said aperture to shift the axis of the aperture in the eccentric bush which receives said second pin into line with the axis of that pin.

4. A disc brake according to claim 2 in which said aperture is located in the caliper member and the eccentric bush is freely rotatable within said aperture, the spacing of said first and second pins being preselected during assembly of the brake to achieve a particular orientation of the eccentric bush relative to said second pin and said aperture, whereby the trailing pin is made to take off a predetermined proportion of the drag force.

5. A disc brake according to claim 2 in which said first pin comprises a sleeve and a bolt which clamps the sleeve to the torque plate so that the sleeve is under compression.

6. A disc brake according to claim 2 in which said first pin comprises a sleeve and an elongated screw-threaded stud which engages corresponding internal screw threads on said sleeve located at the end of the sleeve remote from said torque plate for clamping said sleeve to said torque plate.

7. A disc brake according to claim 6 in which said stud is initially provided with a head to enable the stud to be screwed into said torque plate in a manner to apply a compressive load to said sleeve, said head being arranged to shear off the stud when a predetermined compressive load has been applied to said sleeve.

* * * * *

UNITED STATES PATENT OFFICE
CERTIFICATE OF CORRECTION

Patent No. 3,682,277                 Dated   August 8, 1972

Inventor(s)   Peter William Brown

It is certified that error appears in the above-identified patent and that said Letters Patent are hereby corrected as shown below:

On the cover sheet insert -- [73] Assignee:

Girling Limited, Birmingham, England, a corporation of

Great Britain --.

Signed and sealed this 20th day of March 1973.

(SEAL)
Attest:

EDWARD M. FLETCHER, JR.            ROBERT GOTTSCHALK
Attesting Officer                  Commissioner of Patents